Figure 1:
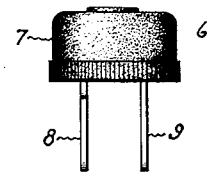

Oct. 13, 1931.  F. C. DE REAMER  1,827,565

METAL INSERT FOR MOLDED PARTS AND METHOD OF MAKING THE SAME

Filed Nov. 22, 1929

Inventor:
Frank C. DeReamer,
by Charles E. Tullar
His Attorney.

Patented Oct. 13, 1931

1,827,565

UNITED STATES PATENT OFFICE

FRANK C. DE REAMER, OF BRIDGEPORT, CONNECTICUT, ASSIGNOR TO GENERAL ELECTRIC COMPANY, A CORPORATION OF NEW YORK

METAL INSERT FOR MOLDED PARTS AND METHOD OF MAKING THE SAME

Application filed November 22, 1929. Serial No. 409,164.

In the manufacture of small molded parts for electrical devices such as switches, receptacles, attachment plugs, etc., it is customary to employ inserts in the form of short, open-ended tubes of small diameter which are threaded internally to receive screws for clamping the circuit wires in place or for fastening punchings to the molded parts. As illustrating the size of these inserts, one which is very largely used has a length of .359", a maximum diameter of .187" and a threaded bore of .100". In addition to this they are shouldered at one end and knurled at the other to ensure good binding with the molding compound. The inserts are mounted on pins in the mold to properly locate them. Due to the high pressures used in such molding operation and because the inserts do not extend entirely through the body being molded, some of the molding material is forced into the inner ends of the inserts between the holding pins and the surrounding wall of the insert. In some cases the insert is so filled with the molding compound that a re-tapping operation is made necessary. Such an operation is the source of trouble and expense, and is frequently the cause of spoiling the article in which the inserts are molded. The reason for this is that the molding material contained in the insert exerts a longitudinal pressure toward the inner end when the tap is inserted and frequently is of such magnitude that it breaks out a section of the molded article adjacent the end of the insert. In some classes of articles the loss is as high as 20% of the product. Some of the articles cost as much as three cents a piece and as they are made by the million in large factories, the loss due to retapping and breakage is a substantial one.

The inserts are commonly made of brass and the work therein is done on screw machines. Seemingly, the remedy for the trouble above mentioned would be to make a closed inner end for the insert and one which is integral with the body part. The objection to this is that a tap cannot cut a full thread closer than one-sixteenth of an inch from a closed end, which means that the insert would have to be made longer to receive the binding screws, which is impracticable because of the thickness of the molded part. Furthermore, at least one-thirty-second of an inch of molded material should cover the inner end of the insert to afford proper insulation therefor. The dimensions of the molded part cannot be increased because they have to cooperate with other parts, the dimensions of which are fixed.

I have invented or discovered a means whereby the above noted objections are entirely overcome and one which is applicable to various types or sizes of hollow inserts adapted to be molded in place at the same time the article itself is molded.

Further, my improved means has the advantage of extreme simplicity and very low cost, both of which items are of paramount importance in mass production.

For a consideration of what I believe to be novel and my invention, attention is directed to the accompanying description and the claims appended thereto.

Figure 3:
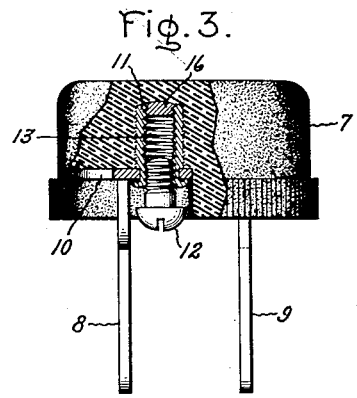
Figure 2:
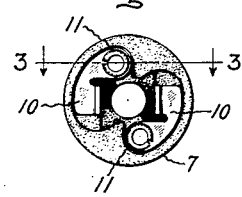
Figure 4:
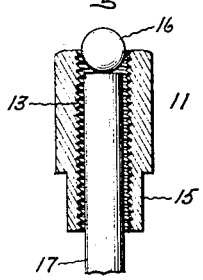
Figure 5:
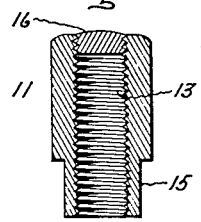
Figure 6:
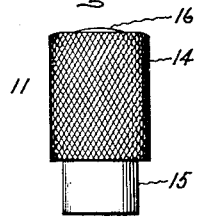

In the drawings which are illustrative of my invention, Fig. 1 is a side elevation, drawn to full scale, of an attachment plug; Fig. 2 is a bottom plan view thereof; Fig. 3 is an enlarged sectional view taken on line 3—3 of Fig. 2; Figs. 4 and 5 are longitudinal sectional views of an insert enlarged approximately four times actual size, and Fig. 6 is a view of the insert in side elevation.

6 indicates an attachment plug of the ordinary type and is used as an illustration and not as a limitation of my invention. Its body portion 7 is made of any suitable insulating compound of which there are many on the market. 8 and 9 indicate the contact members which are adapted to engage suitable contacts carried by a receptacle. Each member has a flat portion 10 which fits into a recess in the body 7 and is held therein by an insert 11, the exposed end of which is riveted over the part 10 to hold the member in place. 12 indicates one of the screws for securing a conductor to its contact member.

The insert comprises a tubular member which is screw threaded internally, as usual, throughout its length, as indicated by the reference character 13. It also has a knurled peripheral surface 14 to assist in anchoring the same in the molded compound. One end of the member has its section reduced as at 15 so as to facilitate riveting over the same to secure the contact member in place.

In order to close the inner end of the insert without increasing its over-all length or in any way decreasing the extent or character of the internal screw thread, the simple expedient is adopted of inserting an expansible plug 16 in the end of the member which extends into the compound. The plug is made of softer material than the insert itself so that when subjected to suitable compression pressure it will be deformed and completely fill the inner end of the insert and enter the screw threads and be anchored against movement thereby. For this purpose an ordinary lead shot of spherical form may be employed, a shown in Fig. 4, the diameter of which is practically the same as the bore of the screw threaded part of the insert so as to drop easily into place. In the manufacture of these inserts, each insert is first machined, drilled, and tapped, and then placed on a pin 17 which positions it, limits the inward movement of the shot and which also serves as an anvil when the shot is subjected to compression pressure or a blow from above to spread or expand the same and cause it to fill the end of the insert and penetrate the screw threads. This work while it can be done by hand, using a hammer to spread the shot or plug, is preferably done by a machine.

The use of the present invention has eliminated the trouble due to the filling of the inner end of the inserts with compound and the necessity of retapping the same. It has also of course overcome the breakage of parts due to such tapping operation. The use of my improved construction has also resulted in a material saving not only of labor but in the articles themselves.

What I claim as new and desire to secure by Letters Patent of the United States is:

1. In a device of the character described, the combination of a base of molded insulating material, a contact carried thereby, a hollow insert for securing the contact to the base which is enclosed within said material except at one end and is threaded to receive a wire clamping screw, and an expanded plug of metal located at the inner end of the insert and held by the threads to prevent the material forming the base from entering the inner end of the insert during the molding operation.

2. In a device of the character described, the combination of a base of molded insulating material, a contact carried thereby, a tubular insert for securing the contact to the base which is enclosed within said material except at one end, is threaded interiorly to receive a clamping screw and is roughened on its outer surface to form an anchoring means, and an expanded plug of soft metal located at the inner end of the insert which fills said end and prevents the material forming the base from being forced into the insert during the molding operation.

In witness whereof, I have hereunto set my hand this twentieth day of November, 1929.

FRANK C. DE REAMER.